Patented May 8, 1928.

1,668,548

UNITED STATES PATENT OFFICE.

HARRY E. BROOKBY, OF CHICAGO, ILLINOIS, AND CARLISLE K. ROOS, OF FORT DODGE, IOWA, ASSIGNORS TO UNITED STATES GYPSUM COMPANY, OF CHICAGO, ILLINOIS, A CORPORATION OF ILLINOIS.

CEMENTITIOUS MATERIAL.

No Drawing. Application filed April 23, 1924. Serial No. 708,325.

This invention relates to improvements in the production of cementitious substances and more particularly the utilization of a material occurring in nature and which from its inherent properties has heretofore been considered unavailable for this purpose.

Calcium sulphate in the hydrated state occurs in nature and when calcined will again take up water and "set". This form is commercially known as gypsum and is used in many industries for various purposes. Calcium sulphate in the anyhdrous state also occurs in nature usually below gypsum deposits and is known as anhydrite. This native mineral anhydrite is an entirely different substance from the commercial calcined gypsum and must not be confused with artificial anhydrite, such as dead burned gypsum. They differ in specific gravity, consistency figure, solubility and general activity. Pure natural anhydrite contains only a few tenths per cent of water while natural impure or partly hydrated deposits will at times contain as much as ten per cent of water. Natural gypsum will contain approximately up to twenty-one per cent of water. The natural anhydrite has practically no commercial value as it has no plastic or cementitious properties and when found in a gypsum deposit is usually considered as waste.

It is an object to so treat and combine the treated natural anhydrite with other substances as to produce a highly desirable plastic and cementitious material, which may be so produced to be used neat or sanded, its plasticity controlled during production as well as its times in setting.

It has been found that extremely fine ground natural anhydrite will hydrate more or less without addition of catalysts but the grinding must be so extremely fine that it is impractical for commercial purposes. This invention contemplates the grinding of the natural anhydrite to a fineness similar to that of high grade plaster and mixing therewith an ingredient to increase the solubility of anhydrite, and a very small percentage of a neutral catalyst or catalysts which will produce the results desired.

In accordance with this invention approximately less than one per cent of sodium thiosulphate is incorporated with the anhydrite to increase its solubility and approximately less than one per cent of zinc sulphate is incorporated as a set producing agent. These catalysts are both neutral and will not react with any carbonates present in the form of impurities in the natural anhydrite. It has been found that one half of one per cent of each of these catalysts ground with the natural anhydrite or ground separately and thoroughly mixed with the ground natural anhydrite will produce a cement that may be used neat or sanded as a substitute for Keene's cement in all finishing.

This anhydrite cement as above described, lacks the degree of plasticity necessary to plastic mortar for the base coat and brown coat in wall plastering work. It has been found that the addition of a colloidal or semi-colloidal substance such as clay, light burned magnesium oxide, zeolites, talc or plastic organic farinaceous materials such as rice or wheat flour, dry paste powders or gums such as dextrine or gum arabic, to the above anhydrite cement its plasticity will be measurably increased and such materials being of slower drying nature than the anhydrite will cause the anhydrite cement mixture to remain wet longer than normal. It has also been found that by the addition of approximately 10% by weight of red clay and approximately 10% by weight of ordinary calcined unretarded gypsum, also known as stucco or commercial gypsum, in this hemi-hydrate state, a further advantage is obtained when mixed with water.

In the latter case the catalyzed anhydrite cement containing the clay and stucco addition may be dry mixed in a mortar box with three parts of sand, water added and mixing continued. The action of the stucco immediately becomes apparent by a stiffening of the mortar. In order to bring it to a workable degree of fluidity extra quantities of water are added. During the mixing the plasticity of the mortar improves and is suitable for plastering purposes. The early stiffening action produced by the stucco lasts not longer than five minutes, so that after continued mixing the mortar reaches a fixed plasticity and remains in that state for hours which is impossible with retarded stucco plasters.

The use of sodium thiosulphate as a catalyst with the anhydrite as above described makes the results stated possible. Another advantage is that the ingredients are ground and mixed either together or separately ground and then mixed. Furthermore the natural anhydrite is employed as it occurs without any preparatory treatment, such as calcining, and the presence of impurities does not affect the process or result thereof.

What we claim is:

1. A cementitious substance comprising ground calcium sulphate in the natural state, blended without calcination with sodium thiosulphate forming a mortar upon the addition of water.

2. A cementitious substance comprising ground anhydrous calcium sulphate in the natural state blended without calcination with less than one per cent of sodium thiosulphate forming a mortar upon the addition of water.

3. A cementitious substance comprising ground anhydrous calcium sulphate in the natural state blended with sodium thiosulphate and zinc sulphate forming a plastic cement upon the addition of water.

4. A cementitious substance comprising ground natural anhydrite blended with less than one per cent of sodium thiosulphate and less than one per cent of zinc sulphate forming a plastic cement upon the addition of water.

5. A cementitious substance comprising ground natural anhydrite blended with sodium thiosulphate, zinc sulphate and a colloidal or semi-colloidal substance forming a plastic base upon the addition of water.

6. A cementitious substance comprising ground anhydrous calcium sulphate blended with less than one per cent of sodium thiosulphate, less than one per cent of zinc sulphate and ten per cent of clay forming a plastic base upon the addition of water.

7. A cementitious substance comprising ground natural anhydrite blended with sodium thiosulphate, zinc sulphate, clay and calcined gypsum forming a plastic retarded plaster upon the addition of water.

8. A cementitious substance comprising ground anhydrous calcium sulphate blended with less than one per cent of sodium thiosulphate and zinc sulphate each, and ten per cent of clay and stucco each, forming a retarded plaster upon the addition of water.

9. A cementitious substance comprising ground anhydrite in the natural state dry mixed without calcination with less than one per cent of ground sodium thiosulphate, less than one per cent of ground zinc sulphate, ten per cent of finely divided clay and ten per cent of calcined calcium sulphate in the hemi-hydrate state forming a plaster upon the addition of water.

HARRY E. BROOKBY.
CARLISLE K. ROOS.